United States Patent [19]

Li et al.

[11] Patent Number: 4,481,677

[45] Date of Patent: Nov. 6, 1984

[54] OPTICAL TRANSMITTING AND RECEIVING APPARATUS

[75] Inventors: Yuan-Lu Li, Ottawa; Leslie J. Crane, Nepean, both of Canada

[73] Assignee: Northern Telecom Limited, Montreal, Canada

[21] Appl. No.: 462,566

[22] Filed: Jan. 31, 1983

[51] Int. Cl.³ .............................................. H04B 9/00
[52] U.S. Cl. .................................... 455/617; 375/17; 455/606
[58] Field of Search .............. 455/606, 607, 608, 613, 455/618, 619; 375/17, 76, 60; 358/171; 307/356

[56] References Cited

U.S. PATENT DOCUMENTS

| | | | |
|---|---|---|---|
| 3,899,429 | 8/1975 | Ueno et al. | 250/199 |
| 3,927,316 | 12/1975 | Citta | 455/613 |
| 4,027,152 | 5/1977 | Brown et al. | 455/612 |
| 4,151,407 | 4/1979 | McBride et al. | 250/199 |
| 4,306,449 | 12/1981 | Hoffman | 73/116 |
| 4,399,564 | 8/1983 | Cowen | 455/617 |

*Primary Examiner*—Marc E. Bookbinder
*Assistant Examiner*—Timothy K. Greer
*Attorney, Agent, or Firm*—R. John Haley

[57] ABSTRACT

Speech signals are optically coupled from a transmitter to a receiver using low duty-cycle infrared pulses. A conditioning circuit converts an a.c. input signal to be transmitted into a unipolar signal, whose magnitude controls the frequency of an oscillator which determines the frequency of the infrared pulses. In the receiver the detected pulses are low-pass filtered in a voice-band filter the output of which is coupled to a telephone line and/or a loudspeaker. A plurality of similar transmitters can be provided to enable signals from an arbitrary number of people to be coupled to a common receiver.

10 Claims, 4 Drawing Figures

OPTICAL TRANSMITTING AND RECEIVING APPARATUS

This invention relates to optical transmitting and receiving apparatus.

An optical, e.g. infrared, information transmission system is known for example from McBride et al. U.S. Pat. No. 4,151,407 issued Apr. 24, 1979. This known system uses an infrared pulse position modulation technique to transmit analog and/or digital information using sufficiently low power that the transmitter can be portable and battery-operated. The patent contemplates that the input device may be a microphone or telephone transmitter. In this system, modulation is effected by varying within a limited range the position of infrared pulses relative to a reference frequency of, for example, 5 kHz. For additional channels, other reference frequencies must be used.

Another optical transmission system is known from Ueno et al. U.S. Pat. No. 3,899,429 issued Aug. 12, 1975. In this system a pulse-frequency modulation technique is used to avoid the need to transmit reference timing pulses. The time spacing of optical pulses is modulated using a ramp generator at the transmitter, and a similar ramp generator is used at the receiver to enable demodulation of the transmitted signal. Such a system is obviously suitable for transmission of only a single information channel.

It is desirable for a telephone user to be able to move around freely during a telephone conversation, and accordingly for him to be provided with a portable microphone and optical transmitter to couple his speech to the telephone. Furthermore, in a conference situation it is desirable to provide each person with an individual microphone and transmitter so that any person's speech can be coupled to the telephone at any time. Normally in such a situation only one person would be speaking at any time, but an arbitrary number of channels would be required.

Accordingly, an object of this invention is to provide new, improved optical transmitting and receiving apparatus.

According to this invention there is provided an optical transmitting and receiving apparatus comprising: oscillator means for producing an output signal at a controllable frequency; control means for controlling said frequency in dependence upon the amplitude of a signal to be transmitted; means responsive to said output signal for emitting optical pulses at the controlled frequency; means for detecting the optical pulses; and filter means for low-pass filtering an output of the detecting means to produce a received signal.

Thus in accordance with the invention optical pulses are emitted at a frequency controlled by the amplitude of the signal to be transmitted. As a result of the pulsed nature of the transmission, the resultant transmitted pulse spectrum has components at not only a carrier frequency of the oscillator but also at multiples of this frequency and at base-band. At the receiver, only the base-band component is selected by the low-pass filtering, thereby to reproduce the original signal as a received signal.

In a preferred embodiment of the invention the signal to be transmitted comprises an a.c. input signal and the control means comprises: means for rectifying the input signal; peak-detecting means responsive to the rectified input signal to produce a d.c. signal in dependence upon the peak amplitude of the rectified input signal; and summing means for summing the d.c. signal and the input signal to produce a unipolar signal for controlling said frequency.

Thus the oscillator frequency is conveniently controlled by a unipolar signal derived from the a.c. input signal.

In order to avoid initial clipping of speech signals, the rectifying means is preferably a full-wave rectifier. In order to suppress input signals having an amplitude less than a threshold level, which signals might comprise external noise rather than speech signals, the apparatus preferably includes means for applying a d.c. bias to the summing means.

The peak-detecting means preferably comprises: a capacitor; means for charging the capacitor to a voltage which is dependent upon the peak amplitude of the rectified input signal; means for discharging the capacitor at a first, relatively slow, rate; and means, responsive to the voltage to which the capacitor is charged falling to a predetermined value, for discharging the capacitor at a second, relatively rapid, rate. The rapid discharge of the capacitor can be arranged to take place to move the carrier frequency of the oscillator rapidly through the pass-band of the filter means in the receiver, to reduce to a low level the noise which is generated in this pass-band as the capacitor discharges in the absence of an input signal.

Conveniently the apparatus includes a microphone and amplifying means responsive to an output signal from the microphone to produce said a.c. input signal, the filter means comprising a low-pass voice-band filter. Such apparatus is particularly useful for optically coupling speech signals from a portable microphone to a telephone. To this end, an output of the filter means is conveniently coupled to a telephone line.

For use in a conference situation, the apparatus may comprise a plurality of independent transmitting apparatus and a common receiving apparatus, each transmitting apparatus comprising a said oscillator means, control means, and means for emitting optical pulses.

Conveniently the oscillator means comprises a frequency-controlled oscillator and a monostable stage for producing low duty-cycle pulses, constituting said output signal, in response to an output of the oscillator. The use of low duty-cycle pulses conserves battery power for the transmitting apparatus and reduces the risk of overlap of pulses from different transmitting apparatus when more than one is present.

In order to suppress noise on switch-on of the transmitting apparatus, the apparatus preferably includes means responsive to power being initially supplied to the transmitting apparatus to inhibit production of said pulses by said monostable stage for a predetermined period.

The means for emitting optical pulses preferably comprises a plurality of infrared light-emitting diodes, which can be physically arranged to emit light in different directions to facilitate reception by the receiving apparatus.

The invention will be further understood from the following description with reference to the accompanying drawings, in which:

FIG. 1 schematically illustrates in the form of a block diagram apparatus in accordance with an embodiment of the invention;

Figure 1:
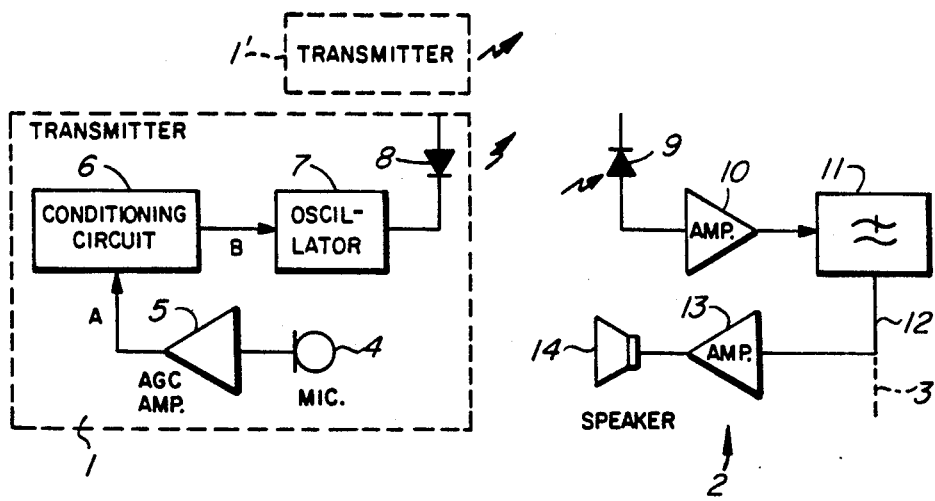

An optical transmitting and receiving apparatus is shown in block diagrammatic form in FIG. 1. The apparatus comprises a transmitter 1 and a receiver 2, the transmitter 1 for example constituting a battery-powered portable microphone and transmitter unit for coupling speech signals from a telephone user to a telephone line 3 shown as a broken line in FIG. 1. In order to conserve battery power, the transmitter 1 is arranged to emit narrow (low duty-cycle) pulses representative of speech signals, and to emit no optical pulses in the absence of speech signals.

To this end, the transmitter 1 comprises a microphone 4 whose output is coupled via an amplifier 5 with automatic gain control (agc) to an input of a signal conditioning circuit 6. An output of the circuit 6 controls the frequency of an oscillator 7 which produces the desired narrow pulses and applies them to an infrared light-emitting diode 8 which correspondingly emits narrow infrared pulses into free-space.

The infrared pulses are received and detected in the receiver 2 by an infrared photodiode detector 9, consequent electrical pulses being amplified in an amplifier 10 and low-pass filtered by a voice-band low-pass filter 11 whose output constitutes the received speech signal. The output of the filter 11 on a line 12 is coupled in known manner to the telephone line 3 to couple the speech to this line and/or via an amplifier 13 to a loudspeaker 14, the telephone line 3 also being coupled via the amplifier 13 to the loudspeaker 14 to provide a return path for speech signals received via the telephone line.

Figure 2A:
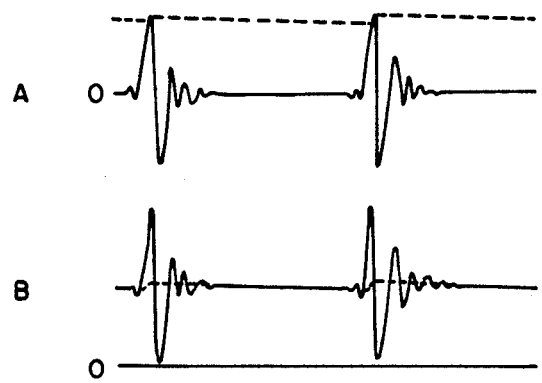
FIG. 2a shows signals illustrating the operation of a conditioning circuit of the apparatus of FIG. 1.

The signal conditioning circuit 6 receives an a.c. input signal from the amplifier 5, such as is illustrated by the signal A in FIG. 2a, and produces from this a unipolar signal such as is illustrated by the signal B in FIG. 2a. To produce the signal B the circuit 6 adds the signal A to the peak value of the signal A, shown by a broken line in FIG. 2a.

Figure 2B:
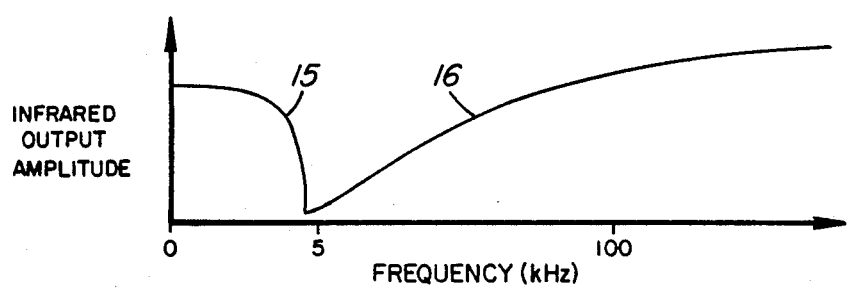
FIG. 2b illustrates the optical spectrum produced by the apparatus of FIG. 1.

The frequency of the oscillator 7 is controlled by the amplitude of the output signal of the circuit 6. The peak value of the a.c. input signal from the amplifier 5 determines a relatively slowly varying carrier frequency for the oscillator. The a.c. input signal amplitude-modulates this peak value, so that correspondingly the oscillator 7 is frequency modulated by the a.c. input signal. As a result of the pulsed nature of the transmitter, the oscillator 7 and consequently the diode 8 produces a frequency spectrum which comprises not only a frequency modulated band centered on the slowly varying carrier frequency of the oscillator, but also frequency modulated bands centered on multiples of this carrier frequency and a base-band centered on a frequency of zero. This frequency spectrum is illustrated in FIG. 2b, in which a part 15 of the spectrum represents the envelope of the base-band and a part 16 of the spectrum represents the envelope of the frequency modulated carrier frequency and its harmonics. As described below, the conditioning circuit 6 is arranged so that the part 16 of the spectrum only substantially extends down to a frequency of about 5 kHz, which is above the range of the base-band part 15 of the spectrum so that the two parts of the spectrum do not overlap to any significant extent.

In the receiver 2 the low-pass filter 11 removes the part 16 of the spectrum to produce the signal on the line 12, which consequently comprises only the base-band part of the spectrum and consequently corresponds to the signal at the input of the conditioning circuit 6 in the transmitter.

Figure 3:
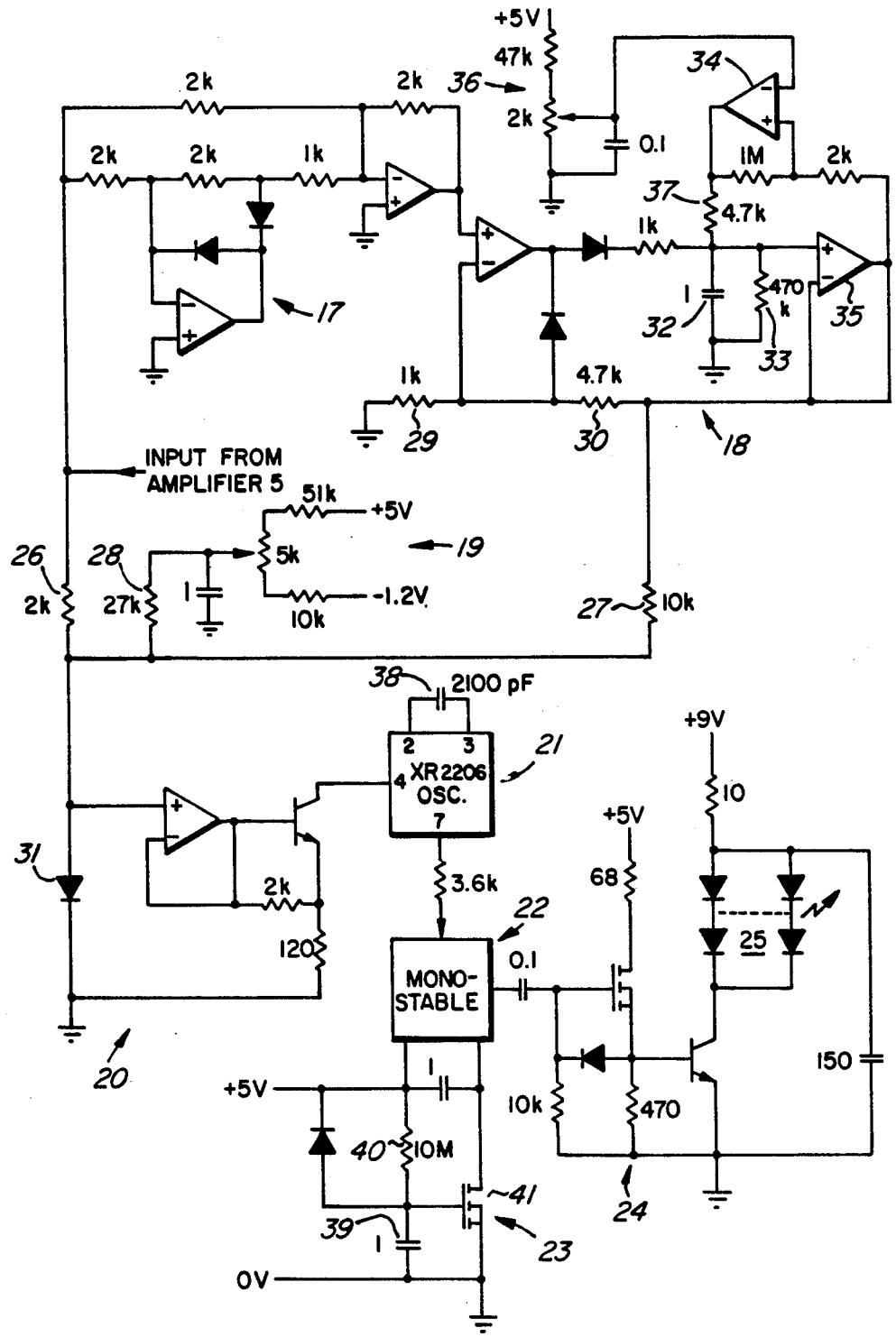
FIG. 3 schematically illustrates in greater detail the conditioning circuit, oscillator, and light-emitting diodes of the apparatus of FIG. 1.

FIG. 3 illustrates in detail a preferred form of the components 6 to 8 of FIG. 1. In FIG. 3, the conditioning circuit 6 is constituted by a full-wave rectifier circuit 17, a peak detector circuit 18, a d.c. biasing circuit 19, and a summing amplifier and voltage-to-current conversion circuit 20, the oscillator 7 is constituted by an oscillator circuit 21, a monostable circuit 22, and a power-up control circuit 23; and the light-emitting diode 8 is replaced by a driver stage 24 and a plurality of infrared light-emitting diodes 25 driven thereby. Typical component values are shown in FIG. 3, the resistances being in ohms and the capacitances being in microfarads except as indicated.

The summing amplifier circuit 20 is supplied with the a.c. input signal from the amplifier 5, the output of the peak detector circuit 18, and a d.c. bias from the circuit 19 via respective weighting resistors 26, 27, and 28. The a.c. input signal is also applied to an input of the full wave rectifier circuit 17, the output of which is applied to the peak detector circuit 18. The circuit 18 has a gain determined by resistors 29 and 30, and this gain and the relative values of the weighting resistors 26 and 27 are selected so that the peak magnitude supplied by the circuit 18 slightly exceeds the peak magnitude of the actual a.c. input signal, thereby ensuring a unipolar signal at the input of the circuit 20. Excessive magnitudes of this unipolar signal, for example greater than about 0.5 volts, are clipped by a diode 31.

The peak detector circuit 18 includes a capacitor 32 which is charged in dependence upon the peak magnitude of the rectified input signal. The voltage to which the capacitor 32 is charged determines the carrier frequency of the oscillator 7, as already described. A relatively high-valued resistor 33 is connected in parallel with the capacitor 32 to discharge the capacitor relatively slowly when the peak magnitude of the a.c. input signal falls or in the absence of an input signal. A comparator 34 compares the voltage to which the capacitor 32 is charged, buffered by a unity-gain buffer amplifier 35, with a reference voltage determined by a potential divider 36. When the voltage of the capacitor 32 falls to the reference voltage, which is set to correspond to an oscillator carrier frequency of about 5 kHz, the comparator 34 is triggered to complete an additional discharge path for the capacitor 32 via a relatively low-valued resistor 37. In consequence the capacitor is discharged relatively rapidly from the reference voltage, so that correspondingly the oscillator carrier frequency is swept rapidly from about 5 kHz to zero frequency, and hence through the voice band. Thus excessive noise, which would otherwise be produced and passed by the receiver filter 11 due to the oscillator carrier frequency passing slowly through the voice band as the capacitor 32 is discharged slowly via the resistor 33, is largely avoided by rapidly discharging the capacitor 32 from the reference voltage. The potential divider 36 is adjustable to permit the reference voltage to be set to a subjectively optimum level.

The d.c. biasing circuit 19 supplies to the input of the circuit 20 a d.c. bias which serves to compensate for offsets of the various differential amplifiers in the conditioning circuit 6 and to provide a small threshold level of effectively opposite polarity to that of the voltage to which the peak detection capacitor 32 is charged. Thus input signals whose peak magnitude does not exceed this threshold level, and which are presumed to arise from external noise rather than speech signals transmission of which is desired, are suppressed at the input of the circuit 20 and are not transmitted. The circuit 19 is adjustable to compensate for different offsets and to provide a variable threshold level.

The output of the circuit 20 is connected to a control input, pin 4, and a tuning capacitor 38 is connected between pins 2 and 3, of a type XR2206 integrated circuit which constitutes the oscillator 21. The output at pin 7 of the oscillator 21 is a square wave at a frequency of about 1 kHz per millivolt of the unipolar signal at the input of the circuit 20. Thus for the range of 0 to 0.5 volt of the signal at the signal at the input of the circuit 20, the oscillator frequency is varied in the range of 0 to 500 kHz.

The output of the oscillator 21 triggers the monostable circuit 22 to produce narrow pulses at the oscillator frequency. For example the monostable circuit 22 produces pulses of 0.25 µs duration, so that even at the highest oscillator frequency the pulsed output of the circuit 22 has a low duty cycle. The output pulses of the monostable circuit 22 are converted into infrared pulses by the light-emitting diodes 25, which are series-parallel connected and driven by the driver stage 24. The plurality of diodes 25 can be physically arranged to emit their pulses in different directions, to facilitate reception of the pulses by the receiver 2 regardless of the orientation or position within a room of the transmitter 1.

In order to suppress noise which may otherwise be produced on switch-on of the transmitter, especially in the event that the transmitter is provided with a switching circuit to provide a negative as well as a positive supply voltage from a single, for example 9 volt, battery, the power-up control circuit 23 is provided to delay the application of power to the monostable circuit 22 for a predetermined period, for example 7 seconds, after switch-on of power to the transmitter. The circuit 23 includes a capacitor 39 which is slowly charged via a resistor 40 to control a transistor switch 41 to complete a power supply circuit to the circuit 22 when the capacitor 39 has been charged to a sufficient voltage level.

Although the above description relates to a single transmitter 1, it should be appreciated that a plurality of such transmitters could be provided for coupling signals to a single, common receiver. FIG. 1 illustrates a second transmitter 1' which can be identical to the transmitter 1. For example in a conference situation involving an arbitrary number of people in a room, each person may be provided with an individual transmitter 1 or 1', enabling his speech signals to be coupled to the receiver 2. The narrow or low duty-cycle pulses produced by each transmitter ensure that overlapping of pulses from two different transmitters, when two people speak simultaneously, is largely avoided, so that each person's speech can be detected with relatively little degradation. The degradation which does occur can be reduced by using narrower pulses and faster light-emitting diodes and photodiodes.

Thus the invention enables an optical coupling of speech signals from one or more persons to a receiver, which can be coupled to a telephone line as described above or alternatively may merely serve to amplify and reproduce the received signals over a loudspeaker, without any telephone connection being involved. Whilst the invention has been described in relation to speech signals, obviously other types of signals can be coupled in a similar manner. Accordingly the invention is not limited to the particular embodiments described, and numerous modifications, variations, and adaptations may be made thereto without departing from the scope of the invention as defined in the claims.

What is claimed is:

1. Optical transmitting and receiving apparatus comprising:
   oscillator means for producing an output signal at a controllable frequency;
   control means for controlling said frequency in dependence upon the amplitude of a signal to be transmitted;
   means responsive to said output signal for emitting optical pulses at the controlled frequency;
   means for detecting the optical pulses;
   filter means for low-pass filtering an output of the detecting means to produce a received signal;
   wherein the signal to be transmitted comprises an a.c. input signal and the control means comprises:
   means for rectifying the input signal;
   peak-detecting means responsive to the rectified input signal to produce a d.c. signal in dependence upon the peak amplitude of the rectified input signal; and
   summing means for summing the d.c. signal and the input signal to produce a unipolar signal for controlling said frequency.

2. Apparatus as claimed in claim 1 wherein the oscillator means comprises a frequency-controlled oscillator and a monostable stage for producing low duty-cycle pulses, constituting said output signal, in response to an output of the oscillator.

3. Apparatus as claimed in claim 2 and including means responsive to power being initially supplied to the transmitting apparatus to inhibit production of said pulses by said monostable stage for a predetermined period.

4. Apparatus as claimed in claim 1 wherein the means for emitting optical pulses comprises a plurality of infrared light-emitting diodes.

5. Apparatus as claimed in claim 1 wherein the rectifying means comprises a full-wave rectifier.

6. Apparatus as claimed in claim 1 and including means for applying a d.c. bias to the summing means, thereby to suppress input signals having an amplitude less than a threshold level.

7. Apparatus as claimed in claim 1 wherein the peak-detecting means comprises:
   a capacitor;
   means for charging the capacitor to a voltage which is dependent upon the peak amplitude of the rectified input signal;
   means for discharging the capacitor at a first, relatively slow, rate; and
   means, responsive to the voltage to which the capacitor is charged falling to a predetermined value, for discharging the capacitor at a second, relatively rapid, rate.

8. Apparatus as claimed in claim 1 and including a microphone and amplifying means responsive to an output signal from the microphone to produce said a.c. input signal, wherein the filter means comprises a low-pass voice-band filter.

9. Apparatus as claimed in claim 1 and comprising a plurality of independent transmitting apparatus and a common receiving apparatus, each transmitting apparatus comprising a said oscillator means, control means, and means for emitting optical pulses.

10. Apparatus as claimed in claim 1, wherein an output of the filter means is coupled to a telephone line.

* * * * *